(12) United States Patent
Dellow

(10) Patent No.: US 8,838,998 B2
(45) Date of Patent: Sep. 16, 2014

(54) CIRCUIT PERSONALIZATION

(71) Applicant: STMicroelectronics R&D Limited, Marlow (GB)

(72) Inventor: Andrew Dellow, Glos (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 0 days.

(21) Appl. No.: 13/750,817

(22) Filed: Jan. 25, 2013

(65) Prior Publication Data

US 2013/0145176 A1 Jun. 6, 2013

Related U.S. Application Data

(63) Continuation of application No. 11/461,239, filed on Jul. 31, 2006, now Pat. No. 8,384,412.

(30) Foreign Application Priority Data

Jul. 29, 2005 (EP) ..................................... 05254795

(51) Int. Cl.
*G06F 11/30* (2006.01)
*G06F 21/73* (2013.01)
*G06F 21/70* (2013.01)

(52) U.S. Cl.
CPC ................ *G06F 21/70* (2013.01); *G06F 21/73* (2013.01)
USPC ........... 713/189; 713/176; 713/193; 713/201; 726/4; 726/10; 726/31; 709/220

(58) Field of Classification Search
CPC .......... H04L 9/32; H04L 9/3242; G06F 21/44
USPC ............ 713/189, 176; 726/4, 31, 10; 380/201
See application file for complete search history.

(56) References Cited

U.S. PATENT DOCUMENTS 5,652,793 A * 7/1997 Priem et al. ..................... 705/56
5,745,571 A    4/1998 Zuk
(Continued)

FOREIGN PATENT DOCUMENTS

EP     1 630 998 A1    3/2006
WO    2004/109972 A1    12/2004

OTHER PUBLICATIONS

Schneck PB, Persistent access control to prevent Piracy, Jul. 1999, IEEE, vol. 7, pp. 1239-1250.*

(Continued)

*Primary Examiner* — Dede Zecher
*Assistant Examiner* — Viral Lakhia
(74) *Attorney, Agent, or Firm* — Seed IP Law Group PLLC

(57) ABSTRACT

A method distributes personalized circuits to one or more parties. The method distributes a generic circuit to each party, encrypts a unique personalization value using a secret encryption key, and transmits each encrypted personalization value to the corresponding party. Each party then stores the encrypted personalization value in their circuit. The stored encrypted personalization value allows a piece of software to be properly executed by the circuit. A semiconductor integrated circuit is arranged to execute a piece of software that inputs a personalization value as an input parameter. The circuit comprises a personalization memory arranged to store an encrypted personalization value; a key memory for storing a decryption key; a control unit comprising a cryptographic circuit arranged to decrypt the encrypted personalization value using the decryption key; and a processor arranged to receive the decrypted personalization value and execute the software using the decrypted personalization value.

29 Claims, 2 Drawing Sheets

(56) References Cited

U.S. PATENT DOCUMENTS

| | | |
|---|---|---|
| 6,185,546 B1 | 2/2001 | Davis |
| 6,640,305 B2 | 10/2003 | Kocher et al. |
| 6,834,269 B1 | 12/2004 | Bueche |
| 6,847,948 B1 | 1/2005 | Paolini et al. |
| 6,950,946 B1 | 9/2005 | Droz et al. |
| 7,051,211 B1 | 5/2006 | Matyas, Jr. et al. |
| 7,085,743 B2 | 8/2006 | Schull |
| 7,089,585 B1 | 8/2006 | Dharmarajan |
| 7,162,644 B1 | 1/2007 | Trimberger |
| 7,181,602 B1 | 2/2007 | Rankl |
| 7,237,123 B2 | 6/2007 | LeVine |
| 7,349,553 B2 | 3/2008 | Rodriguez |
| 7,434,065 B2* | 10/2008 | Rodgers et al. ............... 713/189 |
| 7,551,737 B2 | 6/2009 | Camenisch et al. |
| 7,558,969 B1 | 7/2009 | Lucero et al. |
| 7,592,829 B2 | 9/2009 | Walmsley et al. |
| 7,636,846 B1* | 12/2009 | Eskicioglu .................... 713/176 |
| 7,711,115 B2* | 5/2010 | Candelore ..................... 380/227 |
| 7,802,312 B2 | 9/2010 | You et al. |
| 7,836,300 B2 | 11/2010 | Dellow et al. |
| 7,937,593 B2 | 5/2011 | Chen et al. |
| 8,384,412 B2* | 2/2013 | Dellow .............................. 326/8 |
| 8,572,408 B2* | 10/2013 | Candelore ..................... 713/193 |
| 2002/0046353 A1 | 4/2002 | Kishimoto |
| 2003/0059047 A1* | 3/2003 | Iwamura ....................... 380/201 |
| 2003/0196102 A1 | 10/2003 | McCarroll |
| 2004/0143746 A1 | 7/2004 | Ligeti et al. |
| 2005/0049976 A1 | 3/2005 | Yang |
| 2005/0071639 A1* | 3/2005 | Rodgers et al. ................ 713/176 |
| 2005/0102507 A1 | 5/2005 | Sozzani et al. |
| 2005/0120245 A1* | 6/2005 | Torisaki et al. ................ 713/201 |
| 2005/0125358 A1 | 6/2005 | Levin et al. |
| 2005/0169683 A1* | 8/2005 | Tanaka .......................... 399/400 |
| 2005/0204405 A1 | 9/2005 | Wormington et al. |
| 2005/0234828 A1 | 10/2005 | Matsuyama et al. |
| 2006/0089962 A1 | 4/2006 | Tsukazaki et al. |
| 2006/0149683 A1* | 7/2006 | Shimojima et al. ............. 705/59 |
| 2006/0221686 A1 | 10/2006 | Devadas et al. |
| 2006/0282391 A1 | 12/2006 | Peterka et al. |
| 2009/0031409 A1* | 1/2009 | Murray ........................... 726/10 |
| 2010/0228838 A1* | 9/2010 | Taylor et al. .................. 709/220 |
| 2011/0252440 A1* | 10/2011 | Sridhara et al. ................ 725/31 |

OTHER PUBLICATIONS

Konigs, A., Cryptographic Identification Methods for Smart Cards in the Process of Standardization, Jun. 1991, IEEE Communications Magazine, pp. 42-48.

Rankl, et al., "Handbuch der Chipkarten," Hanser Verlag, Munchen: 2002, pp. 648-654 (with English translation).

* cited by examiner

CIRCUIT PERSONALIZATION

BACKGROUND

1. Field of the Disclosure

The present disclosure relates to semiconductor integrated circuits for use in devices where it is desirable to prevent unauthorized manufacture of copies of those devices.

2. Description of the Related Art

Semiconductor integrated circuits, conveniently referred to below simply as 'circuits', are ubiquitous in modern electronic devices including mobile telephones, pay-television systems, and many other widely used devices. One problem faced by manufacturers of these kinds of devices is that unscrupulous traders attempt to manufacturer and sell illegitimate copies of such devices, drawing valuable custom away from the legitimate device manufacturer. Legitimate device manufacturers typically purchase circuits from another party and assemble them according to their own design. Copying of electronic devices by illegitimate parties, known as cloning, is achieved by obtaining the necessary components and assembling them into an exact copy of the physical circuit board of the device manufacturer, thereby creating an unauthorized copy of the whole device. The software from the original device, executed by a circuit in the device allowing the device to function, is then copied to the cloned device.

A solution to this problem is for the device manufacture to use software that is unique to themselves and for the manufacturer of the circuits to provide circuits that will properly execute only the software of that particular device manufacturer. Such an arrangement may be described as providing a circuit that is personalized to a circuit to a device manufacturer's unique software. In this scheme, different device manufacturers use different software and so require circuits that are personalized to that different software. In this way, so long as the circuit manufacturer supplies circuits personalized to a particular device manufacturer's software only to that device manufacturer, cloning of devices is prevented. This is because when an illegitimate party constructs a copy of a legitimate device and copies the software from that device, the circuit comprised in the copied device would not be correctly personalized to the copied software since correctly personalized circuits would only be supplied to the legitimate device manufacturer and the illegitimate party would therefore not be able to obtain them.

One problem with this approach is that the manufacture of a different circuit design type is required for each end device manufacturer. This involves the time consuming process of testing each separate circuit type at the manufacturing stage and the logistical difficulty in distributing the appropriate circuit to each device manufacturer.

We have appreciated the need to prevent circuits sold for use in a device from operating in a copy of that device. We have also appreciated the need for a method for distributing circuits that are personalized whilst avoiding the problems mentioned above.

BRIEF SUMMARY

According to one embodiment, a circuit manufacturer supplies circuits in a generic form to one or more device manufacturers. The circuits may then be incorporated into devices and individually personalized by the device manufacturers under the control of the circuit manufacturer.

In one embodiment, each circuit comprises a processor arranged to execute software in the form of computer executable code, the software being designed so that it will only properly execute if the software is supplied a predetermined value as an input. Each device manufacturer uses different software, the software being distinguishable by the input value required by the software. The circuit also comprises a memory arranged to store a value. During execution, the software is supplied with a value derived from the value stored in the memory. The software will properly execute only if the correct value is stored in the memory.

The circuit manufacturer supplies generic circuits in which the memory is empty so that an individual circuit may be subsequently personalized by a device manufacturer by storing the appropriate value in the memory according to the value required by that device manufacturer's software. This circuit personalization process thereby allows the circuit to properly execute a device manufacturer's unique software.

In order that the circuit manufacturer retains control over the circuit personalization process, the value stored in the memory is an encrypted version of the value required by the software. To achieve this, the value required by a device manufacturer's software is transmitted to the circuit manufacturer who encrypts the value using a secret encryption key known only to the circuit manufacturer. The encrypted value is then transmitted back to the device manufacturer who causes the encrypted value to be stored in the memory. During use of a device, the encrypted value stored in the memory is decrypted using a decryption key stored in the circuit and the unencrypted value is then supplied to the software. The encryption key used in this process, and hence the decryption key stored in the circuit is the same for all circuits thereby maintaining the generic nature of the circuits. The nature of the cryptographic algorithm used is such that the identity of the corresponding encryption key cannot be found even if the identity of the decryption key is known.

In this way, a device manufacturer cannot personalize a circuit without the assistance of the circuit manufacturer since the device manufacturer does not know the identity of the encryption key necessary to produce the appropriate encrypted value to store in the memory. The circuit manufacturer can thus restrict the parties who may personalize a circuit. If an illegitimate party is prevented from personalizing a circuit for use in a cloned device to software copied from a legitimate device to the cloned device, then the cloned device will not properly function.

In an embodiment, a method comprises: associating a first personalization value with a first plurality of generic circuits; associating a second personalization value with a second plurality of generic circuits; encrypting, using one or more configured processing devices, the first personalization value; encrypting, using the one or more configured processing devices, the second personalization value; initiating storage of the encrypted first personalization value in the first plurality of generic circuits; and initiating storage of the encrypted second personalization value in the second plurality of generic circuits, wherein each of the first plurality of generic circuits and each of the second plurality of generic circuits is configured to: retrieve an encrypted personalization value stored in the respective generic circuit; decrypt the retrieved encrypted personalization value; and use the decrypted personalization value to control execution of software. In an embodiment, the associating the first personalization value with the first plurality of generic circuits comprises receiving the first personalization value. In an embodiment, the initiating storage of the encrypted first personalization value in the first plurality of generic circuits comprises transmitting the encrypted first personalization value. In an embodiment, transmitting the first personalization value comprises further encrypting the encrypted first personalization value. In an embodiment, the decrypting the retrieved personalization value comprises using a first decryption key, the first decryption key being stored in the first plurality of generic circuits and stored in the second plurality of generic circuits. In an embodiment, the encrypting the first personalization value comprises using a first encryption key. In an embodiment, the encrypting the second personalization value comprises using the first encryption key.

In an embodiment, a method comprises: receiving a first plurality of generic circuits; transmitting a first personalization value associated with the first plurality of generic circuits; receiving the first personalization value in an encrypted form; and storing the received encrypted first personalization value in the first plurality of generic circuits, wherein each of the first plurality of generic circuits is configured to control execution of a piece of software by retrieving and decrypting the stored encrypted first personalization value. In an embodiment, the method comprises: receiving a second plurality of generic circuits; transmitting a second personalization value associated with the second plurality of generic circuits; receiving the second personalization value in an encrypted form; and storing the received encrypted second personalization value in the second plurality of generic circuits, wherein each of the second plurality of generic circuits is configured to control execution of a second piece of software by retrieving and decrypting the stored encrypted second personalization value. In an embodiment, the first plurality of generic circuits and the second plurality of generic circuits store a secret common decryption key used to decrypt stored encrypted personalization values. In an embodiment, the first personalization value comprises a first number and the second personalization value comprises a second number. In an embodiment, the encrypted first personalization value is received in a further encrypted form. In an embodiment, the method comprises incorporating each of the first plurality of generic circuits into a respective electronic device.

In an embodiment, an integrated circuit comprises: a personalization memory; a key memory configured to store a decryption key; a personalization controller configured to: control storage of a received encrypted version of a software personalization value in the personalization memory; and decrypt the stored encrypted version of the personalization value using the decryption key stored in the key memory; and a processor configured to control execution of software based on the decrypted software personalization value received from the personalization controller. In an embodiment, the personalization memory is a one-time-programmable memory. In an embodiment, the key memory is a one-time-programmable memory. In an embodiment, the decryption key is permanently recorded into the key memory at a circuit manufacturing stage. In an embodiment, the personalization controller is configured to restrict access to the personalization memory. In an embodiment, the personalization controller is configured to restrict access to the key memory. In an embodiment, the personalization value comprises a number. In an embodiment, the processor is configured to perform a circuit reset if the decrypted personalization value is different from the personalization value.

In an embodiment, a system comprises: a system memory; a processor configured to execute software; a personalization memory; a key memory; and a personalization controller configured to: control storage of a received encrypted version of a software personalization value in the personalization memory; and decrypt the stored encrypted version of the personalization value using a decryption key stored in the key memory, wherein the processor is configured to control execution of software stored in the system memory based on the decrypted software personalization value. In an embodiment, the personalization memory is a one-time-programmable memory and the key memory is a one-time-programmable memory. In an embodiment, the decryption key is permanently recorded into the key memory at a circuit manufacturing stage. In an embodiment, the personalization controller is configured to restrict access to the personalization memory and to restrict access to the key memory. In an embodiment, the processor is configured to perform a circuit reset if the decrypted personalization value is different from a software personalization value associated with the software stored in the software memory. In an embodiment, the system comprises a number memory coupled to the processor and configured to store decrypted personalization values decrypted by the personalization controller. In an embodiment, the system comprises an integrated circuit including the personalization memory, the key memory and the personalization controller. In an embodiment, the integrated circuit includes the processor and a number memory. In an embodiment, the personalization controller comprises a cryptographic circuit configured to decrypt the stored encrypted version of the personalization value.

BRIEF DESCRIPTION OF THE SEVERAL VIEWS OF THE DRAWINGS

Embodiments will now be described with reference to the figures in which.

DETAILED DESCRIPTION

Figure 1:
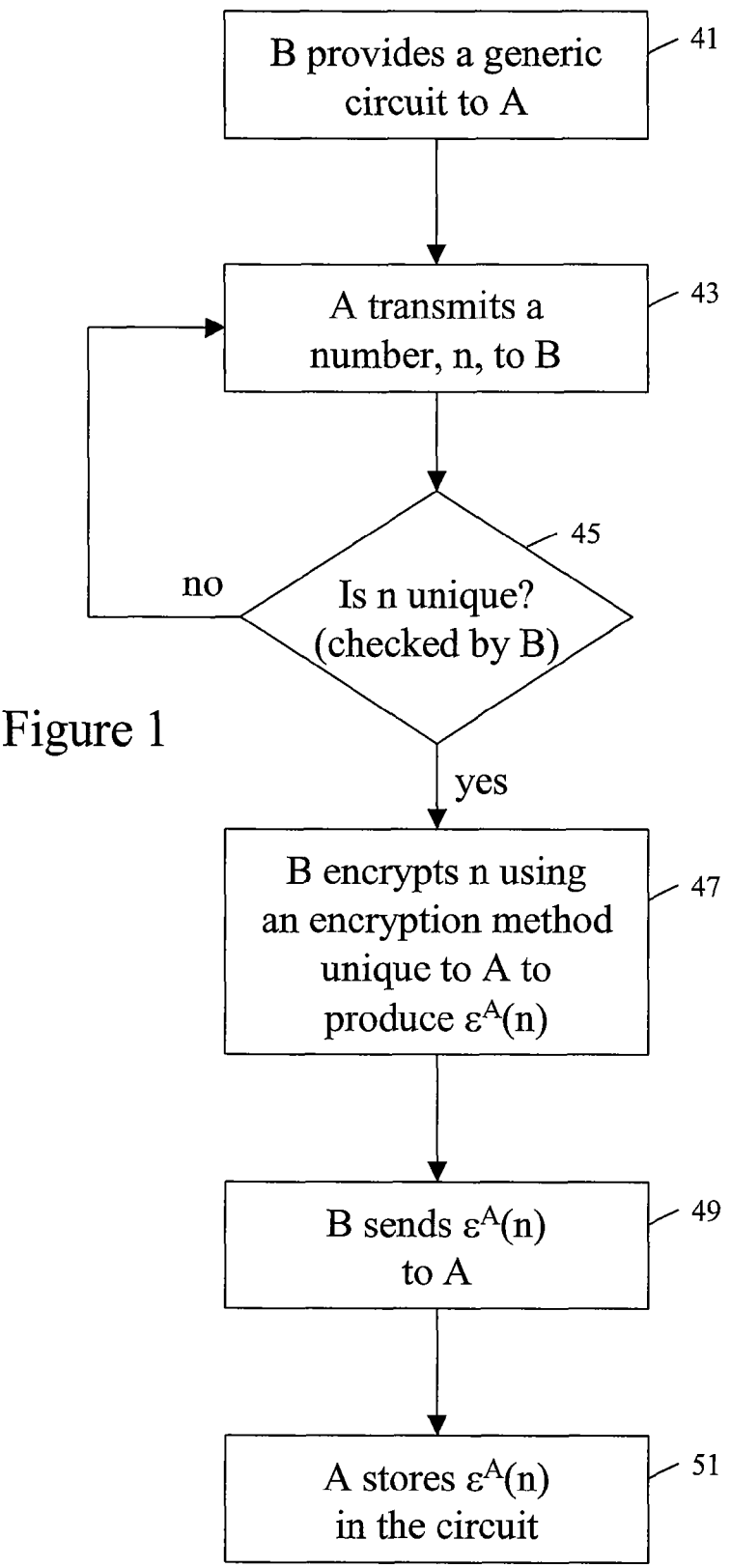
FIG. 1 is a flow diagram of a method for personalizing a generic circuit according to one embodiment.

In one exemplary method according to an embodiment, a circuit manufacturer supplies circuits in a generic form. In particular, circuits are supplied to one or more device manufacturers who incorporate the circuits into their devices. An advantage is that by supplying the circuits in a generic form, the manufacturing and testing costs, and logistical problems of supplying a different circuit design type to each device manufacturer are avoided.

During use, a circuit executes software in the form of computer executable code to provide for various operations of the device incorporating the circuit. The circuit may be personalized so that a specific piece of software will be correctly executed by the circuit only when the circuit is correctly personalized to that software. Each device manufacturer uses software in a form that is unique to each device manufacturer so that the specific software associated with a particular device manufacturer requires a specific personalization of circuits. In this way, the software associated with a particular device manufacturer will not be properly executed by a circuit that is not personalized, or that is personalized to a different device manufacturer's software. Therefore, software copied from one device manufacturer's device to another device manufacturer's device will not properly execute thereby preventing one device manufacturer from illegitimately using another device manufacturer's software. One embodiment provides a method and apparatus for allowing the device manufacturer to personalize a circuit themselves but under the control of the circuit manufacturer so that unauthorized personalization, and therefore use of, circuits can be prevented. It is understood that some or all of the method steps described below as being performed by the circuit manufacturer or device manufacture could alternatively be carried out by an authorized associated party. For example, the circuit manufacturer could delegate the process of distributing generic circuits and allowing the circuits to be personalized to a distributor.

When a device incorporating a circuit according to one embodiment is copied or cloned, the software executed by the circuit in the original device will be copied and loaded into the cloned device. One advantage is that the circuit incorporated into the cloned device would not properly execute the copied software unless or until the circuit is correctly personalized to that particular software. Since a circuit can only be personalized under the control of the circuit manufacturer, the party cloning the device is prevented by the circuit manufacturer from correctly personalizing the circuit and therefore producing a functioning device.

A further advantage is that if a hacker attempted to replace the legitimate software loaded into a device with his own modified software in order to breach the security of the device, the device would no longer function as the modified software and the circuit executing the software would not be correctly personalized to each other.

In one example application, the device manufacturer is a manufacturer of set-top-boxes for use in pay television which incorporate circuits provided by a circuit manufacturer. The set-top-box manufacturer needs to ensure that its set-top-boxes and/or associated software are not cloned or copied, for example by another set-top-box manufacturer.

According to one method for personalizing a circuit to correctly execute a specific piece of software, the software is written in such a way that it will be correctly executed by the circuit only if a predetermined value, such as a number, is supplied to the software as an input parameter. For example, the software may have encoded within it various instructions such as conditional jumps and calculations involving the input parameter. When the correct value is supplied to the software, the result of the conditional jumps or calculations will be such that the computer instructions will be executed in the correct order and using the correct parameters. If the wrong value is supplied to the software, the computer instructions will be executed in the wrong order and using incorrect parameters. A particular device manufacturer's software may be rendered unique by requiring a unique value that is different from the values required by other device manufacturer's software.

When the software is executed, the software is supplied with a value that is derived from a value stored by the circuit. In this way, a circuit may be personalized to a specific piece of software by storing the correct value in the circuit.

As mentioned above, in one exemplary embodiment, the circuit forms part of a set-top-box in a pay-television system. In this embodiment, a set-top-box manufactured by a set-top-box manufacturer, referred to as party A, comprises a circuit provided by a circuit manufacturer, referred to as party B. The set-top-box manufacturer A then loads software into the set-top-box which will be executed by the circuit during use of the set-top-box. The software is designed to be executed properly only when the correct number is supplied to it. It is therefore necessary to personalize the circuit to enable the circuit to correctly execute the software.

FIG. 1 is a flow diagram of a method for personalizing a circuit according to one embodiment. At a first step 41, the circuit manufacturer B provides one or more generic circuits to the set-top-box manufacturer A, who incorporates the circuits into set-top-boxes. The circuits are generic in the sense that there are no variations in the circuits that are provided to different set-top-box manufacturers so that the circuits provided by the circuit manufacture are substantially identical.

At a next step 43, the set-top-box manufacturer A transmits a value, for example in the form of a number, n, to the circuit manufacturer B. This number is that which will be required by the set-top-box manufacturer's particular piece of software that will be executed by circuits incorporated into their set-top-boxes. The value may be, for example, an integer in binary form selected from a predetermined range by the set-top-box manufacturer A. Although in this embodiment the value is a number, it is understood that any other suitable code or identification may be used to personalize a circuit.

The number may be transmitted from the set-top-box manufacturer A to the circuit manufacturer B by any suitable means such as by wireless broadcasting or via an electronic network. In order to increase the security of the personalization process, the number may be transmitted in an encrypted form.

At a next step 45, the circuit manufacturer B checks whether the number, n, received from the set-top-box manufacturer A is unique. The number, n, is considered unique if the same number has not already been previously received from a different set-top-box manufacturer. This corresponds to the condition that no two set-top-box manufacturers use software requiring the same number. It is understood that a particular set-top-box manufacture could use more than one number, corresponding to an individual set-top-box manufacturer using several different pieces of software requiring different numbers. What is important is that no two set-top-box manufacturers use software requiring the same number.

If the circuit manufacturer B determines that the number, n, received from the set-top-box manufacturer A is not unique, the circuit manufacturer B notifies the set-top-box manufacturer A that the number is not valid and requests the set-top-box manufacturer A to provide a different number. In this case, steps 43 and 45 are repeated until the set-top-box manufacturer A provides a unique number. In an alternative embodiment, the circuit manufacturer B could specify the number used for each set-top-box manufacturer. In this way, the circuit manufacturer B could easily guarantee that each set-top-box manufacturer uses a different number without needing to perform the number selection and checking steps 43 and 45.

If the number received from the set-top-box manufacturer A is unique, at a next step 47, the circuit manufacture B encrypts the number. For convenience, the encrypted number may be written as $\epsilon(n)$, where $\epsilon$ represents a cryptographic transform of n. In one embodiment, the number is encrypted using the RSA encryption algorithm using an encryption key X. The number, n, may be obtained from the encrypted number, $\epsilon(n)$ by decryption using a decryption key, X', complimentary to the encryption key, X. It is understood that any other suitable encryption algorithm could be used other than that described above.

In order for the circuit manufacturer B to maintain control over the circuit personalization process, the encryption key used to encrypt the numbers remains secret, meaning that they are not known to any party other than the circuit manufacture B. It is therefore important that the identity of the encryption key cannot be determined even if both the original number, n, and the encrypted number, $\epsilon(n)$, are known since the set-top-box manufacturer will have knowledge of both of these values. The circuit manufacturer B retains control of the personalization process because encryption of a chosen number is a required step of the personalization method and because only the circuit manufacturer B can perform this encryption. The party which controls the circuit personalization process in this way, in this case the circuit manufacturer B, may be referred to as an authority.

At a next step 49 the circuit manufacturer B transmits the encrypted number, $\epsilon(n)$, to the set-top-box manufacturer A. Receipt of the encrypted number by the set-top-box manufacturer A may provide the set-top-box manufacturer A with an indication that the number, n, is valid for the purpose of personalizing circuits. The encrypted number may be transmitted by any suitable means as described above and is preferably transmitted in an encrypted form to prevent unauthorized parties from discovering the identity of the encrypted number.

It is understood that the method steps 43, 45, 47 and 49 described above may be performed before the set-top-box manufacturer has actually manufactured any set-top-boxes, or even before it has acquired any generic circuits, i.e. before method step 41. In the case where the validity of the number used by a set-top-box manufacturer is not guaranteed, for example if the set-top-box manufacturer is not aware which numbers have been used by other set-top-box manufacturers, then it is preferable to perform method steps 43 and 45 before the software is written to avoid rewriting software if the chosen number is not valid.

At a next step 51 the set-top-box manufacturer A causes the encrypted number, $\epsilon(n)$, to be stored in the circuits incorporated in the set-top-box manufacturer A's set-top-boxes. The process of storing the encrypted number, $\epsilon(n)$, in the memory on the circuits results in personalization of each circuit to the set-top-box manufacturer's software. If the value of $\epsilon(n)$ is not revealed to any party other than the set-top-box manufacturer A, then no party other than the set-top-box manufacturer A can personalize circuits to the set-top-box manufacturer A's software.

During use of a set-top-box manufactured by set-top-box manufacturer A, when the software loaded into the set-top-box is executed by the circuit, in order to properly execute the software must be supplied with the appropriate number, n as an input parameter. The encrypted number, $\epsilon(n)$, is retrieved and decrypted by the circuit using the decryption key, X', that is complementary to the encryption key, X, used to produce the encrypted number. The decrypted number, n, is then supplied to the software which then properly executes by virtue of the correct personalization of the circuit to the software.

The decryption key X' may be stored as an integral part of the circuit. For example, the decryption key may be stored in a permanent manner on the circuit at the manufacturing stage. Since the same encryption key is used to encrypt all numbers used by each set-top-box manufacturer, the same decryption key is stored on every circuit, maintaining the generic nature of the circuits. It is important that the algorithm used to encrypt and decrypt the numbers is such that even if the identity of the decryption key is known, it is not possible to derive the identity of the complementary encryption key. This ensures that the identity of the encryption key remains secret even if the identity of the complimentary decryption key can be read from the circuit.

As mentioned above, the encrypted number, $\epsilon(n)$, is stored in the circuit rather than the number, n, itself so that the circuit manufacturer B retains control over the personalization of the circuit. If the number, n, itself was stored then any party such as an unauthorized manufacturer producing cloned set-top-boxes could freely personalize circuits without any contact with the circuit manufacturer B. In this case, the unauthorized manufacturer could obtain generic circuits and incorporate these into cloned set-top-boxes. The software from a legitimate set-top-box could then be copied and transferred to the cloned set-top-box. The unauthorized manufacturer could then personalize the circuit to the copied software by storing the appropriate number in the circuit to produce a functioning set-top-box. This would allow unscrupulous manufacturers to use other manufacturer's software without authorization.

Since the number is stored in an encrypted form, and the key used to encrypt the number is secret, an unauthorized party would not know what encrypted value to store in the circuit, even if the correct number itself was known. Storing the incorrect encrypted value would result in incorrect personalization of the circuit.

Figure 2:
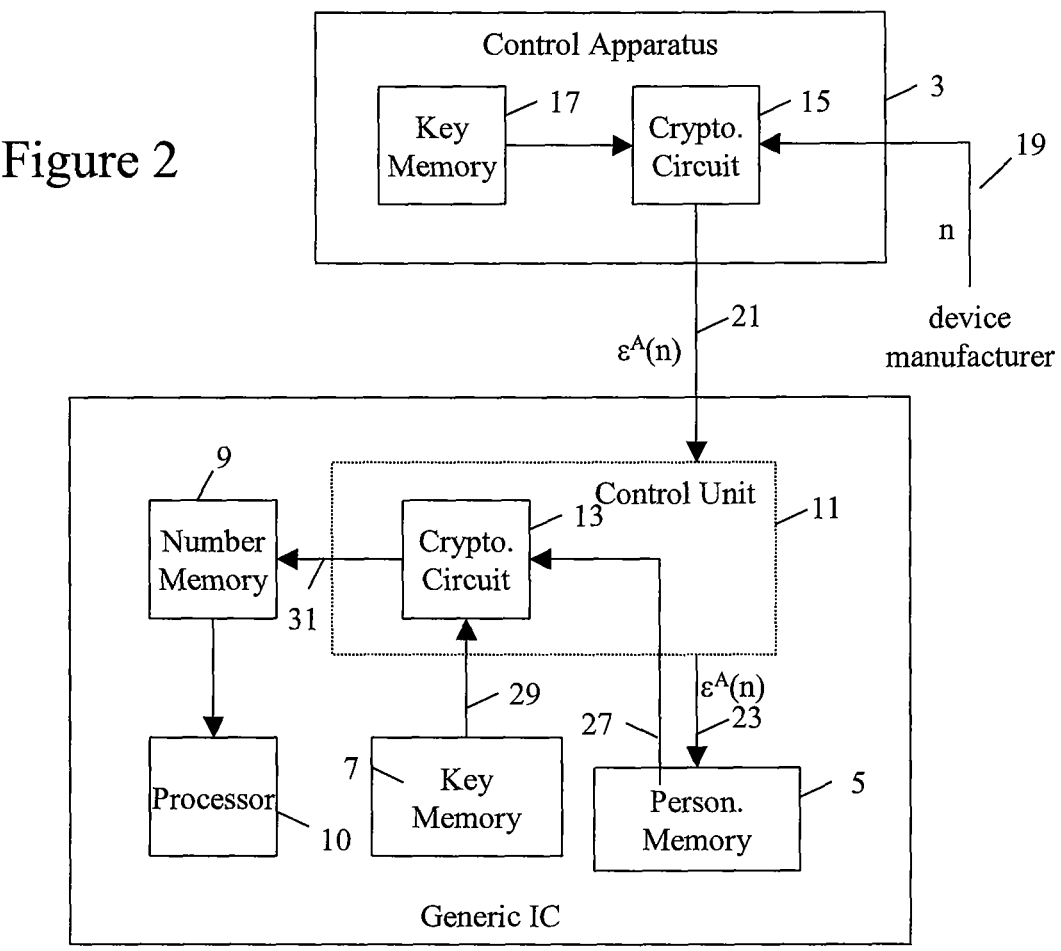
FIG. 2 is a schematic diagram of a semiconductor integrated circuit according to one embodiment.
Figure 3:
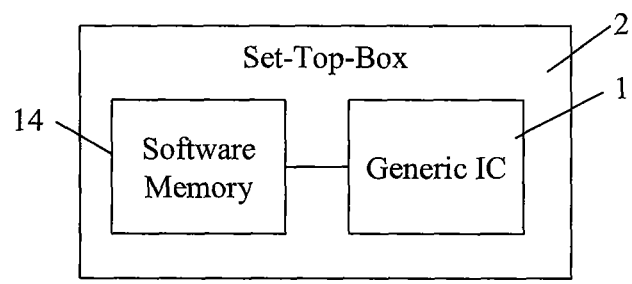
FIG. 3 is a set-top-box that includes the integrated circuit of FIG. 2.

FIG. 2 is a schematic diagram of a system according to an embodiment. The system comprises a semiconductor integrated circuit 1, which may, for example, form part of a set-top-box 2 (FIG. 3) for use in a pay television system manufactured by the set-top-box manufacturer A. The system also comprises a personalization control apparatus 3 which is operated under the control of the circuit manufacturer B. The personalization control apparatus 3 and the circuit 1 are remotely located from each other.

The circuit 1 comprises a personalization memory 5, a key memory 7, a number memory 9, a processor 10 and a personalization control unit 11 which in turn comprises a cryptographic circuit 13. The personalization memory 5 is arranged to store a value, in the form of a number, n, in an encrypted form and the key memory 7 is arranged to store a decryption key, X'. The cryptographic circuit 13 is arranged to decrypt the encrypted number, $\epsilon(n)$, stored in the personalization memory 5 using the decryption key, X', stored in the key memory 7. The number memory 9 is arranged to store the decrypted number, n output from the cryptographic circuit 13. The processor 10 is arranged to execute software in the form of computer executable code stored in an external memory 14 (FIG. 3) arranged so that the software will only properly execute if the processor receives a predetermined number from the number memory 9.

The personalization control apparatus 3 comprises a cryptographic circuit 15 and a key memory 17. The cryptographic circuit 15 is arranged to encrypt a number using an encryption key, X, stored in the key memory 15.

As described in greater detail above, when it is desired to personalize the circuit 1, the set-top-box manufacturer A sends the circuit manufacturer B a number n which is used to personalize the circuit 1. The number is transmitted by the set-top-box manufacturer A to the personalization control apparatus 3 via communication link 19 which may be, for example, an over-air broadcast. The personalization control apparatus 3 determines whether the received number is unique, for example by comparing the number with a list of numbers stored in a updateable database (not shown) that have previously been used by other set-top-box manufacturers to personalize their circuits. If the received number is not unique then the personalization control apparatus 3 transmits a signal back to the set-top-box manufacturer A requesting another number.

If the number received by the personalization control apparatus 3 is unique then the number is input into the cryptographic circuit 15. The encryption key, X, is retrieved from the key memory 17 and also input into the cryptographic circuit 15. The cryptographic circuit 15 then encrypts the number, n, using the encryption key and the encrypted number, $\epsilon(n)$, is output from the cryptographic circuit 15 and transmitted from the personalization control apparatus 3 via communication link 21. The communication link 21 may be, for example, an over-air broadcast. In one embodiment, in order to increase security, the encrypted number, $\epsilon(n)$, may be further encrypted for transmission between the personalization control apparatus 3 and the set-top-box manufacturer A.

In order to personalize the circuit 1, the set-top-box manufacturer A inputs the encrypted number received from the personalization control apparatus 3 into the circuit 1. The encrypted number is transmitted via communication link 23 from the personalization control unit 11 before being input and stored in the personalization memory 5. Once the encrypted number has been stored in the personalization memory 5, the circuit 1 becomes personalized.

Once the encrypted number is written to the personalization memory 5, the stored value should not be able to read from outside of the circuit 1 otherwise the encrypted number, $\epsilon(n)$, stored in the personalization memory could be read by an unauthorized party and written to the personalization memory of a cloned device. If the corresponding software were then copied to the cloned device, this would result in correct personalization of the cloned device.

Advantageously, the personalization memory 5 is isolated from the other parts of the circuit 1 other than via the personalization control unit 11. In this way, the personalization memory 5 can be accessed only via the personalization control unit 11. This strictly limits the access to the personalization memory 5 by hackers thereby increasing the security of the system. In one embodiment, the personalization memory 5 is a one-time-programmable memory which cannot be modified once it has been written to initially. In this case, once the encrypted number has been written to the personalization memory 5, the circuit 1 becomes permanently personalized.

During use of the set-top-box 2 containing the circuit 1, a piece of software loaded into the external memory (14) of the set-top-box is executed by the processor 10. The software is designed so that it will only properly execute if the number n is supplied to it. The circuit 1 is correctly personalized if the number n stored in encrypted form $\epsilon(n)$ in the personalization memory 5 corresponds to the number required by the software that is executed by the processor 10. Upon execution of the software, the personalization control unit 11 causes the encrypted number, $\epsilon(n)$, stored in the personalization memory 5 to be retrieved and transmitted via communication link 27 to the cryptographic circuit 13 comprised in the personalization control unit 11. The cryptographic circuit 13 also receives the decryption key X' retrieved from the key memory 7 and transmitted via communication link 29 to the cryptographic circuit 11.

The decryption key, X', stored in key memory 7 is complementary to the encryption key, X, stored in the key memory 17 of the personalization control apparatus 3 that was used to encrypt the number. In an embodiment, the decryption key, X', is stored in a permanent manner on the circuit. For example, the decryption key is 'burnt' onto the circuit or stored in a one-time programmable memory at the circuit manufacturing stage. As with the personalization memory 5, the key memory 7 is isolated from other parts of the system and is only accessible via the personalization control unit 11.

The cryptographic circuit 13 is arranged to decrypt the encrypted number, $\epsilon(n)$, using the decryption key, X', to produce the unencrypted number, n, which is then output from the cryptographic circuit 13 and personalization control unit 11 via communication link 31. The unencrypted number is transmitted to and stored in the number memory 9.

When the software loaded into the set-top-box is executed by the processor 10, the number stored in the number memory 9 is transmitted to the processor 10 via communication link 33 which supplies the number to the software. As described in greater detail above, only when the number supplied is correct will the software execute properly. If the wrong value is stored in the personalization memory, then the software will not execute properly.

The circuit 1 may be a monolithic device to prevent hackers from replacing components illegitimately or from feeding their own values into the system, thereby increasing the security of the system.

In the description above, reference has been made to a set-top-box manufacturer A and a circuit manufacturer B. Embodiments of the disclosure may be employed in relation to personalization of circuits for use in devices other than set-top-boxes, and it is understood that the circuit personalization process may be carried out between parties other than a circuit manufacturer and device manufacturer.

In one variation for example, the circuit manufacturer B may supply circuits to another party such as a circuit distributor D for distribution to other parties. Since distributor D distributes the circuits, it may be more convenient for the distributor D to maintain control over circuit personalization rather than the circuit manufacturer B itself. Similarly, it may be more convenient for the device manufacturer A to delegate the process of circuit personalization to a subsidiary C. In this case, the process of personalization may be carried out between the distributor D and the subsidiary C. The distributor D would perform the steps described above in relation to the circuit manufacturer B while the subsidiary C would perform the steps described above in relation to the set-top-box manufacturer A. In this example, distributor D is the authority.

Knowledge of the encrypted value, $\epsilon(n)$, provides the capability of personalizing a circuit to a particular piece of software requiring the value, n, to execute properly. For this reason, the encrypted value, $\epsilon(n)$, may be thought of as a kind of key to allow the software to be used. The device manufacturer could thus sell the known encrypted value, $\epsilon(n)$, to another party which would allow the other party to manufacture devices using the original device manufacturer's software. In effect, selling the encrypted value, $\epsilon(n)$, is equivalent to providing a license to use the associated software.

In the embodiments described above, the encryption key and complimentary decryption key used in the circuit personalization process were the same for all circuits. This retains the generic nature of the circuits. However, in order to increase the security of the process the encryption and decryption keys may be changed periodically. For any particular batch of generic circuits manufactured within a particular time range the same encryption and decryption keys are used for all circuits although the keys used for a different batch of generic circuits manufactured at a later time will be different. For example, the encryption and decryption keys could be changed every year. In this way, if an unauthorized party did acquire the encrypted value, $\epsilon(n)$, for a particular device manufacturer's software, they could only personalize circuits originating from a limited batch of generic circuits. This is because the encrypted value, $\epsilon(n)$, requires a particular decryption key to decrypt it, whereas a new batch of circuits would contain a different and therefore wrong decryption key.

From the foregoing it will be appreciated that, although specific embodiments have been described herein for purposes of illustration, various modifications may be made without deviating from the spirit and scope of the disclosure.

The invention claimed is:
1. A method, comprising:
 associating a first personalization value with a first plurality of generic circuits;

associating a second personalization value with a second plurality of generic circuits, the first and second pluralities of generic circuits being respective subsets of a set of generic circuits;

initiating storage of respective secret decryption keys associated with the first plurality of generic circuits and the second plurality of generic circuits;

encrypting, using one or more configured processing devices, the first personalization value;

encrypting, using the one or more configured processing devices, the second personalization value;

initiating storage of the encrypted first personalization value in the first plurality of generic circuits; and initiating storage of the encrypted second personalization value in the second plurality of generic circuits, wherein each of the first plurality of generic circuits and each of the second plurality of generic circuits is configured to:

retrieve an encrypted personalization value stored in the respective generic circuit;

decrypt the retrieved encrypted personalization value using a stored secret encryption key associated with the generic circuit; and use the decrypted personalization value to control execution of software.

2. The method of claim 1 wherein the associating the first personalization value with the first plurality of generic circuits comprises receiving the first personalization value.

3. The method of claim 2 wherein the initiating storage of the encrypted first personalization value in the first plurality of generic circuits comprises transmitting the encrypted first personalization value.

4. The method of claim 3 wherein the transmitting the first personalization value comprises further encrypting the encrypted first personalization value.

5. The method of claim 1 wherein the initiating storage of respective secret decryption keys comprises storing a first decryption key, in the first plurality of generic circuits and a second decryption key in the second plurality of generic circuits.

6. The method of claim 1 wherein the encrypting the first personalization value comprises using a first encryption key.

7. The method of claim 6 wherein the encrypting the second personalization value comprises using the first encryption key.

8. A method, comprising:

receiving a first plurality of generic circuits;

transmitting a first personalization value associated with the first plurality of generic circuits;

receiving the first personalization value in an encrypted form;

storing the received encrypted first personalization value in the first plurality of generic circuits, wherein each of the first plurality of generic circuits is configured to control execution of a piece of software by retrieving and decrypting the stored encrypted first personalization value, the decrypting the stored encrypted first personalization value including using a secret decryption key common to each of the first plurality of generic circuits;

receiving a second plurality of generic circuits;

transmitting a second personalization value associated with the second plurality of generic circuits;

receiving the second personalization value in an encrypted form; and storing the received encrypted second personalization value in the second plurality of generic circuits, wherein each of the second plurality of generic circuits is configured to control execution of a second piece of software by retrieving and decrypting the stored encrypted second personalization value using a secret key common to the second plurality of generic circuits, the first and second pluralities of generic circuits being respective subsets of a set of generic circuits.

9. The method of claim 8 wherein the secret key common to the first plurality of generic circuits is the same key as the secret key common to the second plurality of generic circuits.

10. The method of claim 8 wherein the first personalization value comprises a first number and the second personalization value comprises a second number.

11. The method of claim 8 wherein the encrypted first personalization value is received in a further encrypted form.

12. The method of claim 8, further comprising incorporating each of the first plurality of generic circuits into a respective electronic device.

13. An integrated circuit, comprising:

a personalization memory;

a key memory configured to store a decryption key common to a first plurality of generic integrated circuits;

a personalization controller configured to:

control storage of a received encrypted version of a software personalization value, the personalization value being common to the first plurality of generic integrated circuits, in the personalization memory; and decrypt the stored encrypted version of the personalization value using the decryption key stored in the key memory; and a processor configured to control execution of software based on the decrypted software personalization value received from the personalization controller, wherein the integrated circuit is one of the first plurality of generic circuits, the first plurality of generic circuits is one of multiple pluralities of generic circuits each associated with respective decryption keys and personalization values, and each of the multiple pluralities of generic circuits is a respective subset of a set of generic circuits.

14. The integrated circuit of claim 13 wherein the personalization memory is a one-time-programmable memory.

15. The integrated circuit of claim 13 wherein the key memory is a one-time-programmable memory.

16. The integrated circuit of claim 13 wherein the decryption key is permanently recorded into the key memory at a circuit manufacturing stage.

17. The integrated circuit of claim 13 wherein the personalization controller is configured to restrict access to the personalization memory.

18. The integrated circuit of claim 17 wherein the personalization controller is configured to restrict access to the key memory.

19. The integrated circuit of claim 13 wherein the personalization value comprises a number.

20. The integrated circuit of claim 13 wherein the processor is configured to perform a circuit reset if the decrypted personalization value is different from the personalization value.

21. A system, comprising:

a system memory;

a processor configured to execute software;

a personalization memory;

a key memory; and a personalization controller configured to:

control storage of a received encrypted version of a software personalization value in the personalization memory; and decrypt the stored encrypted version of the personalization value using a decryption key stored in the key memory, wherein the processor is configured to control execution of software stored in the system memory based on the decrypted software personalization value, the decryption key and the personalization value are common to a first plurality of generic circuits, the first plurality of generic circuits being one of multiple pluralities of generic circuits each associated with respective decryption keys and personalization values, and each of the multiple pluralities of generic circuits being a respective subset of a set of generic circuits.

22. The system of claim 21 wherein the personalization memory is a one-time-programmable memory and the key memory is a one-time-programmable memory.

23. The system of claim 22 wherein the decryption key is permanently recorded into the key memory at a circuit manufacturing stage.

24. The system of claim 21 wherein the personalization controller is configured to restrict access to the personalization memory and to restrict access to the key memory.

25. The system of claim 21 wherein the processor is configured to perform a circuit reset if the decrypted personalization value is different from a software personalization value associated with the software stored in the software memory.

26. The system of claim 21, further comprising a number memory coupled to the processor and configured to store decrypted personalization values decrypted by the personalization controller.

27. The system of claim 21, further comprising an integrated circuit, the integrated circuit being one of the first plurality of generic circuits and including the personalization memory, the key memory and the personalization controller.

28. The system of claim 27 wherein the integrated circuit includes the processor and a number memory.

29. The system of claim 21 wherein the personalization controller comprises a cryptographic circuit configured to decrypt the stored encrypted version of the personalization value.

* * * * *